(12) United States Patent
Trenka

(10) Patent No.: US 10,091,321 B2
(45) Date of Patent: Oct. 2, 2018

(54) SYSTEM AND PROCESS FOR DYNAMICALLY UPDATING A WEB PAGE

(71) Applicant: AI MEDIA GROUP, INC., New York, NY (US)

(72) Inventor: Ronald M. Trenka, New York, NY (US)

(73) Assignee: AI MEDIA GROUP, INC., New York, NY (US)

(*) Notice: Subject to any disclaimer, the term of this patent is extended or adjusted under 35 U.S.C. 154(b) by 25 days.

(21) Appl. No.: 15/160,902

(22) Filed: May 20, 2016

(65) Prior Publication Data

US 2016/0352859 A1    Dec. 1, 2016

Related U.S. Application Data

(60) Provisional application No. 62/167,140, filed on May 27, 2015.

(51) Int. Cl.
*H04L 29/08* (2006.01)

(52) U.S. Cl.
CPC .......... *H04L 67/2852* (2013.01); *H04L 67/02* (2013.01); *H04L 67/1008* (2013.01); *H04L 67/22* (2013.01)

(58) Field of Classification Search
CPC ...... H04L 67/02; H04L 67/1008; H04L 67/22
See application file for complete search history.

(56) References Cited

U.S. PATENT DOCUMENTS

| 6,578,068 B1* | 6/2003 | Bowman-Amuah ... G06F 9/465 709/203 |
| 7,103,671 B2* | 9/2006 | Quiggle .............. H04L 12/6418 709/227 |
| 2002/0007393 A1* | 1/2002 | Hamel .............. G06F 17/30902 709/203 |
| 2003/0061288 A1* | 3/2003 | Brown .................. H04L 51/066 709/206 |
| 2003/0061299 A1* | 3/2003 | Brown ................ H04L 67/2823 709/214 |
| 2003/0140100 A1* | 7/2003 | Pullara .................... H04L 29/06 709/203 |
| 2003/0177233 A1* | 9/2003 | Quiggle .............. H04L 12/6418 709/225 |

\* cited by examiner

*Primary Examiner* — Ranodhi Serrao
(74) *Attorney, Agent, or Firm* — Collard & Roe, P.C.

(57) ABSTRACT

At least one embodiment of the invention relates to a system and process for dynamically updating a web page. This can occur by automatically modifying data over a computer network comprising a first application server, a database server, at least one proxy server, at least one computer network coupling the first application server, the database server, and the at least one proxy server together. The at least one remote computer is coupled to the at least one computer network, wherein the at least one remote computer is configured to communicate through the at least one computer network to the proxy server and wherein the application server is configured to update data to be presented on the proxy server such that a user in communication with the computer network receives an updated web page.

9 Claims, 17 Drawing Sheets

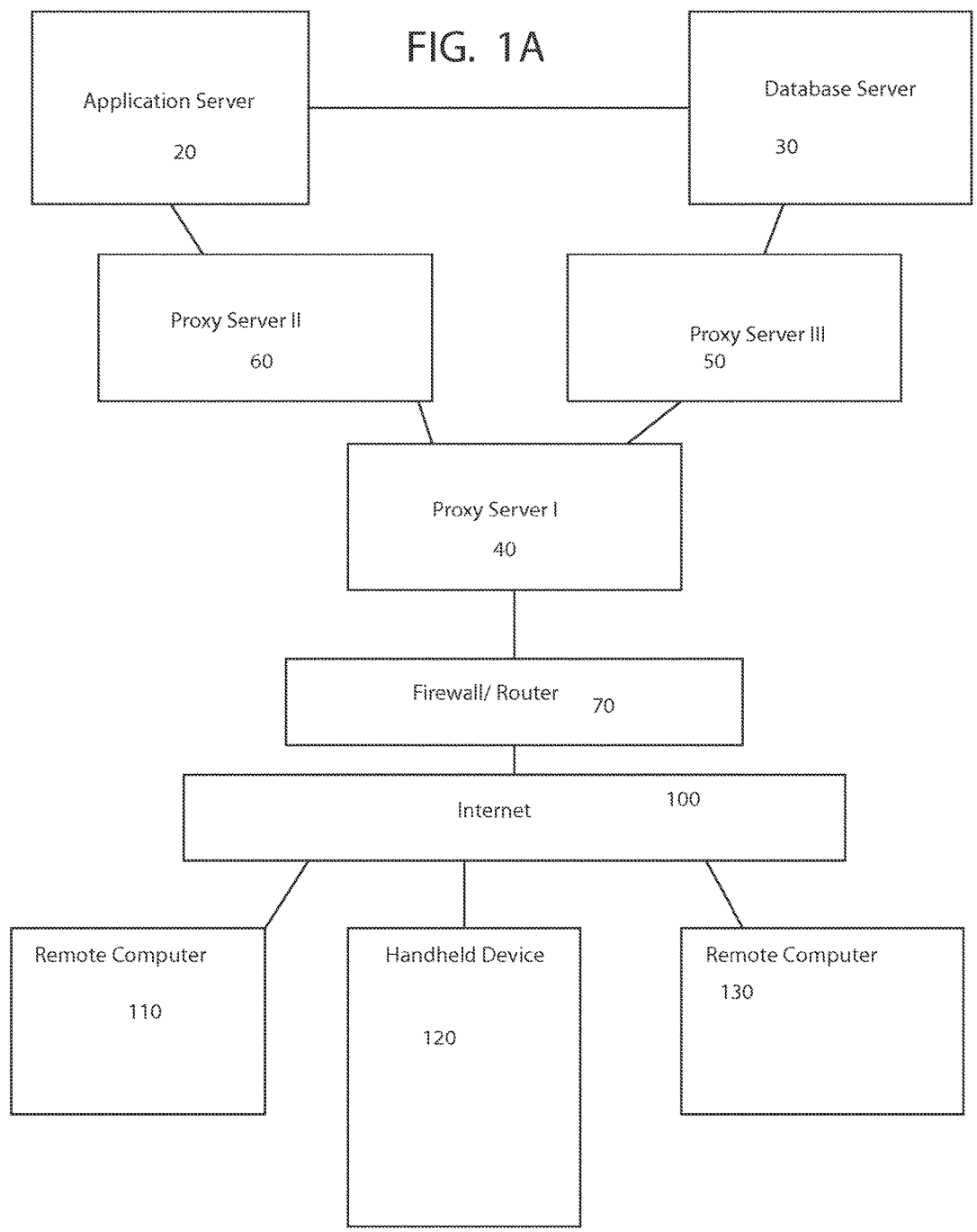

SYSTEM AND PROCESS FOR DYNAMICALLY UPDATING A WEB PAGE

CROSS REFERENCE TO RELATED APPLICATIONS

This application is a non-provisional application claiming priority under 35 119e from provisional application Ser. No. 62/167,140 filed on May 27, 2015, the disclosure of which is hereby incorporated herein by reference in its entirety.

BACKGROUND

At least one embodiment of the invention relates to a system and a process for updating a web page using a computer network. The system can include at least one proxy server. The at least one proxy server is configured to provide information to the web page to be updated.

When a user searches for items that the user wishes to find, the user may type in certain search criteria or have particular cookies lodged in the user's computer. Previously this information may not have been used to dynamically update web pages. Therefore, there is a need to provide a system and a process for dynamically updating web pages and for providing this dynamic information to a user.

SUMMARY

At least one embodiment of the invention relates to a system and process for dynamically updating a web page. This can occur by automatically modifying data over a computer network comprising a first application server, a database server, at least one proxy server, at least one computer network coupling the first application server, the database server, and the at least one proxy server together. The at least one remote computer is coupled to the at least one computer network, wherein the at least one remote computer is configured to communicate through the at least one computer network to the proxy server and wherein the application server is configured to update data to be presented on the proxy server such that a user in communication with the computer network receives an updated web page.

There can be at least one proxy server which comprises a plurality of proxy servers comprising at least one master proxy server and a plurality of slave proxy servers which are configured to be controlled by the master proxy server. The system can further comprise at least one load balancer which is configured to determine which of the plurality proxy servers that the system should use. In addition, the load balancer is configured to determine which proxy server to select based upon the amount of processing power used by each proxy server. In addition, the load balancer is configured to determine which proxy server to select based upon the amount of bandwidth and network traffic that each proxy server is using. Furthermore, the master proxy administrator server is configured to switch between each of the plurality of proxy servers based upon instructions from the load balancer.

In addition, the application server, the database server, each of the plurality of proxy servers, and the load balancer each comprise at least a microprocessor.

In one embodiment the application server, the database server, and each of the plurality of proxy servers, and the load balancer each further comprise at least one memory.

In at least one embodiment, this application server is configured to perform the following steps: requesting information from at least one user; requesting information from the at least one proxy server; requesting information from the at least one database server, analyzing using at least one microprocessor in the application server the contents of the user, the proxy server, and the database server to determine which content to further update to the proxy server.

In at least one embodiment there can be the step of transforming information presented on the proxy server based upon the step of analyzing using the application server the contents of the user, the proxy server and the database server.

In at least one embodiment there is an application server which is configured to gather the following information from the user: the IP address of the user; the telephone number of the user; the web history of the user; web cookies of the user, and login information from the user.

In at least one embodiment, the system is configured to perform the following additional step: matching the telephone number of the user with the user's identity.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 1A is a first block diagram of a computer network;

DETAILED DESCRIPTION

Figure 1B:
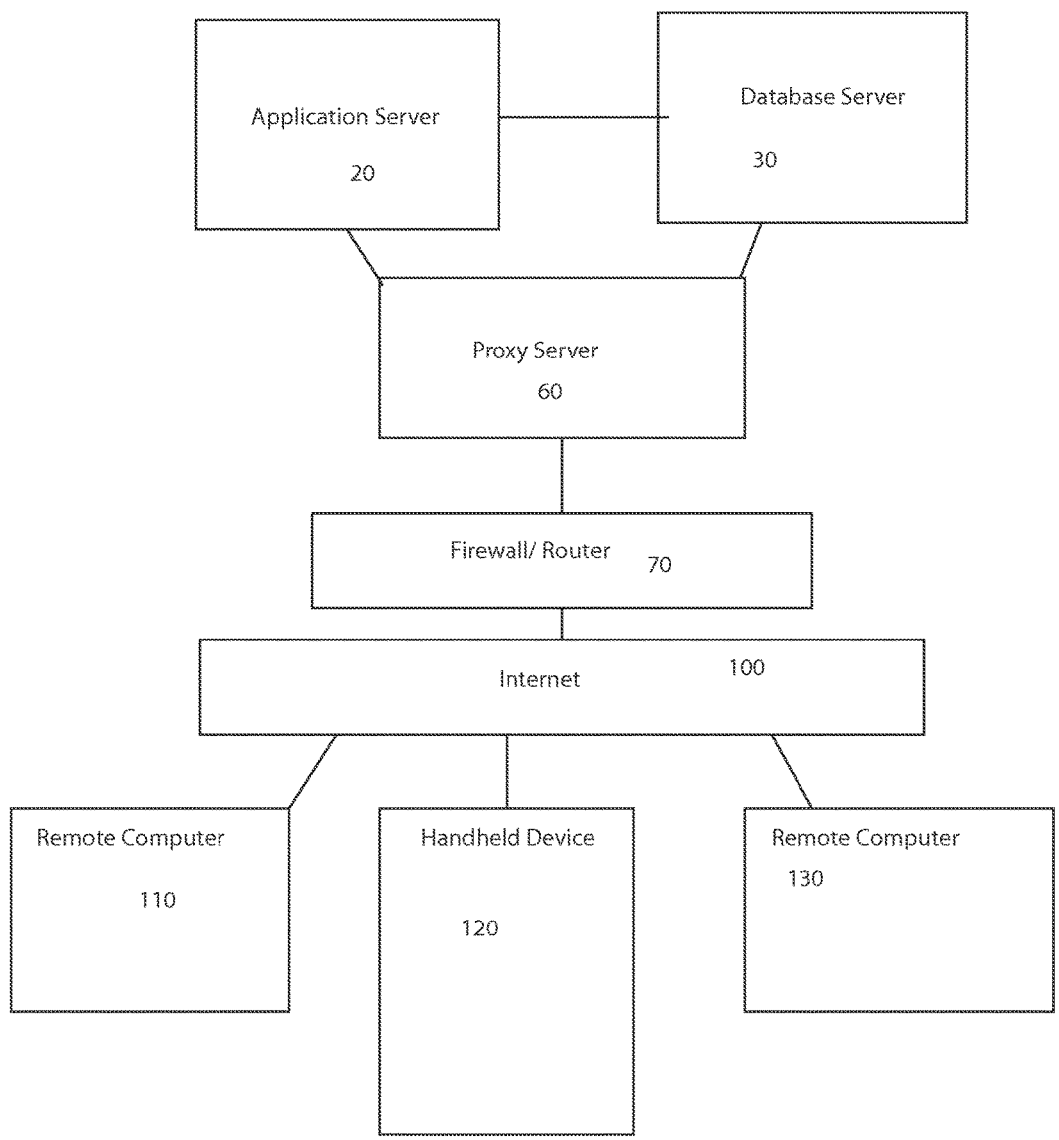
FIG. 1B is a second schematic block diagram of a computer network.

Referring in detail to the drawings, FIG. 1 is a schematic block diagram of a computer network according to a first example of the invention. For example, there is an application server 20, a database server 30, a plurality of proxy servers including but not limited to a first proxy server 40, a second proxy server 60, and a third proxy server 60. There is also a firewall/router 70, which is coupled to first proxy server 40 and has outward facing ports to the internet 100A plurality of user based devices such as a remote computer 110, a handheld device 120 and a remote computer 130 can be/are coupled to the internet. Essentially any type of user device such as a cellular telephone a portable computer device such as a tablet, a laptop, a stationary personal computer can be coupled to the internet and in communication with proxy server 40 as well as the additional proxy servers 50, 60 and application server 20 and database server 30. These servers, including application server 20 and database server 30 as well as the proxy servers 40, 50 and 60 can be incorporated into a single server or each of these servers can be incorporated into multiple distributed cloud based servers. Therefore, while application server 20 indicates a single server, it can be distributed across multiple different servers. Database server 30 can also be distributed across multiple different servers as well.

With respect to the proxy servers, first proxy server 40 serves as an initial gateway server which serves web pages which are dynamically created by the application server using content stored on database server 30, and then sent to proxy servers 50 and 60.

FIG. 1B shows a more simplified version of the system shown in FIG. 1A wherein a single proxy server sits before, or in front of a single application server 20, and a single database server 30.

Figure 1C:
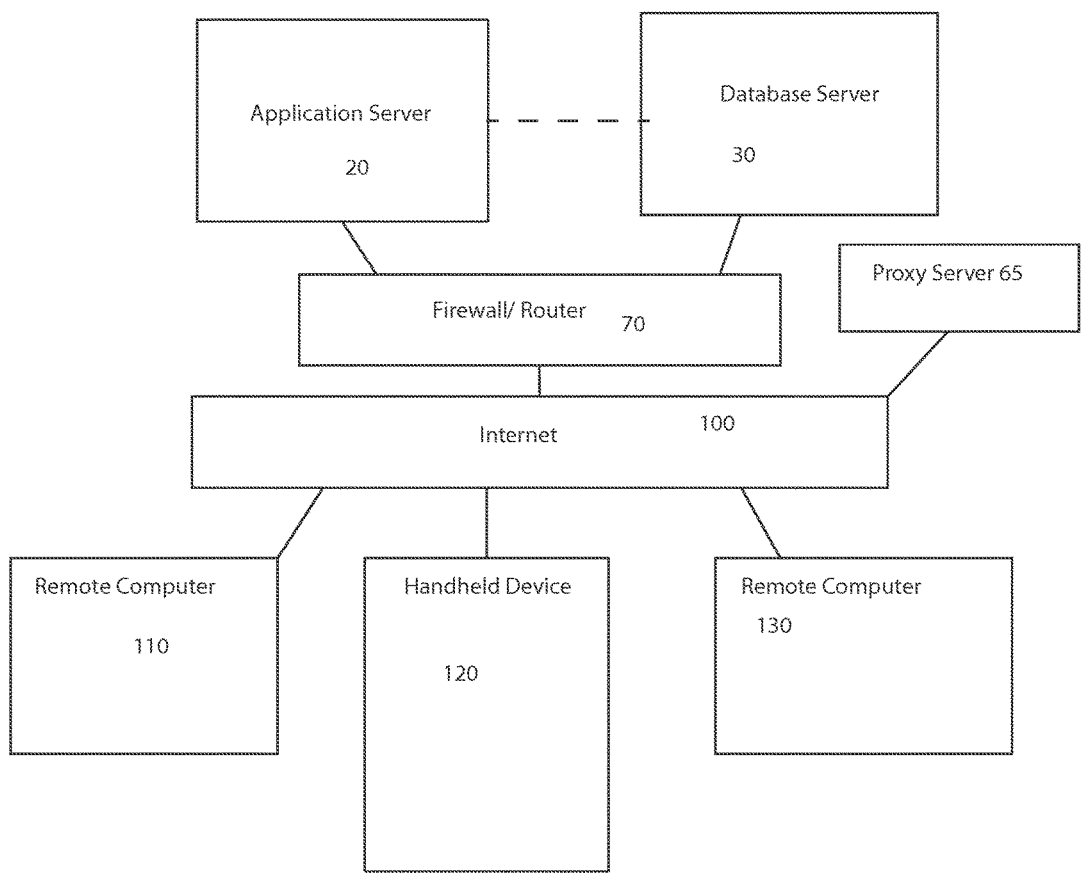
FIG. 1C is a is a third schematic block diagram of a computer network.

FIG. 1C is another example which shows proxy server 65 coupled to the internet in a distributed environment. With this embodiment, the proxy server 65 is not located behind the same firewall as the application server 20 and the database server 30. Rather, this proxy server is located in a different location and is accessed when the user seeks to access a web page provided by the system associated with application server 20 and database server 30.

Figure 1D:
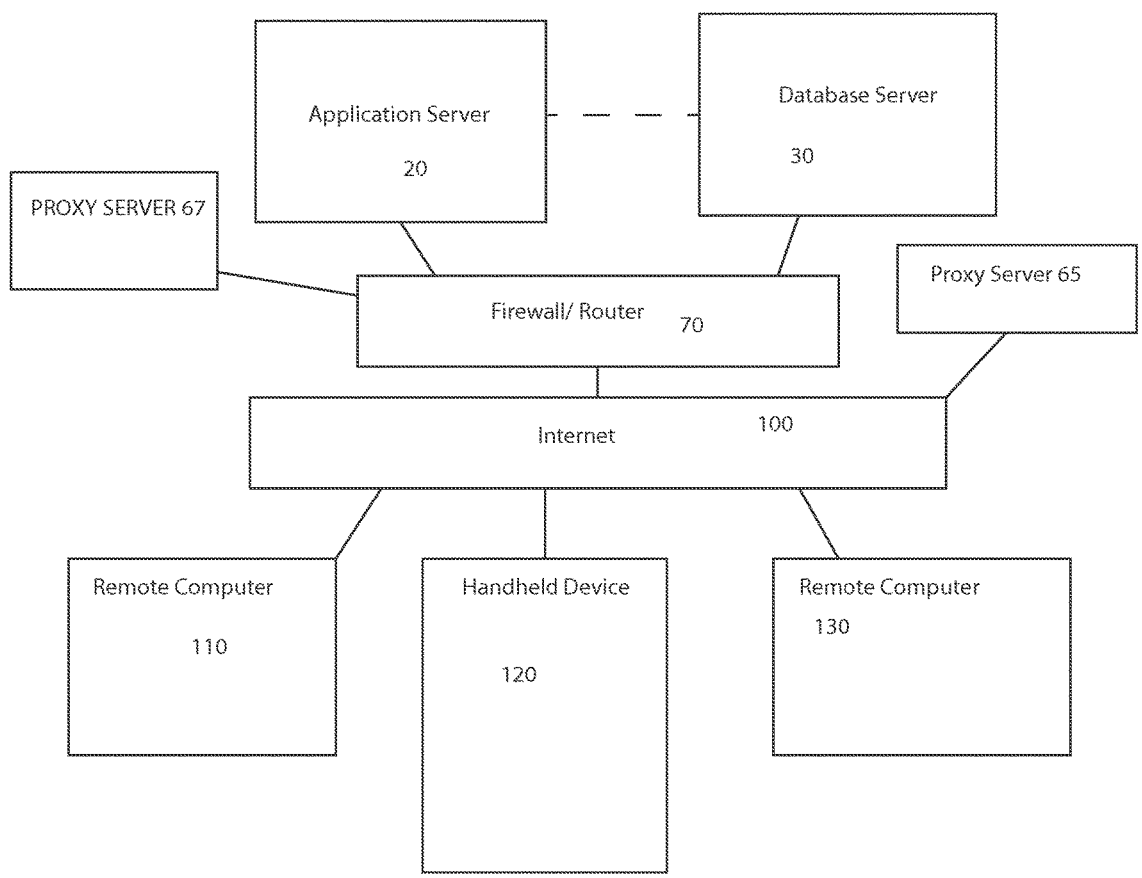
FIG. 1D is a fourth schematic block diagram of a computer network.

FIG. 1D is another embodiment which discloses an additional proxy server 67 which is also part of a distributed environment wherein this proxy server 67 is located in a different location from application server 20 and database server 30 as well as a different location from proxy server 65.

Figure 1E:
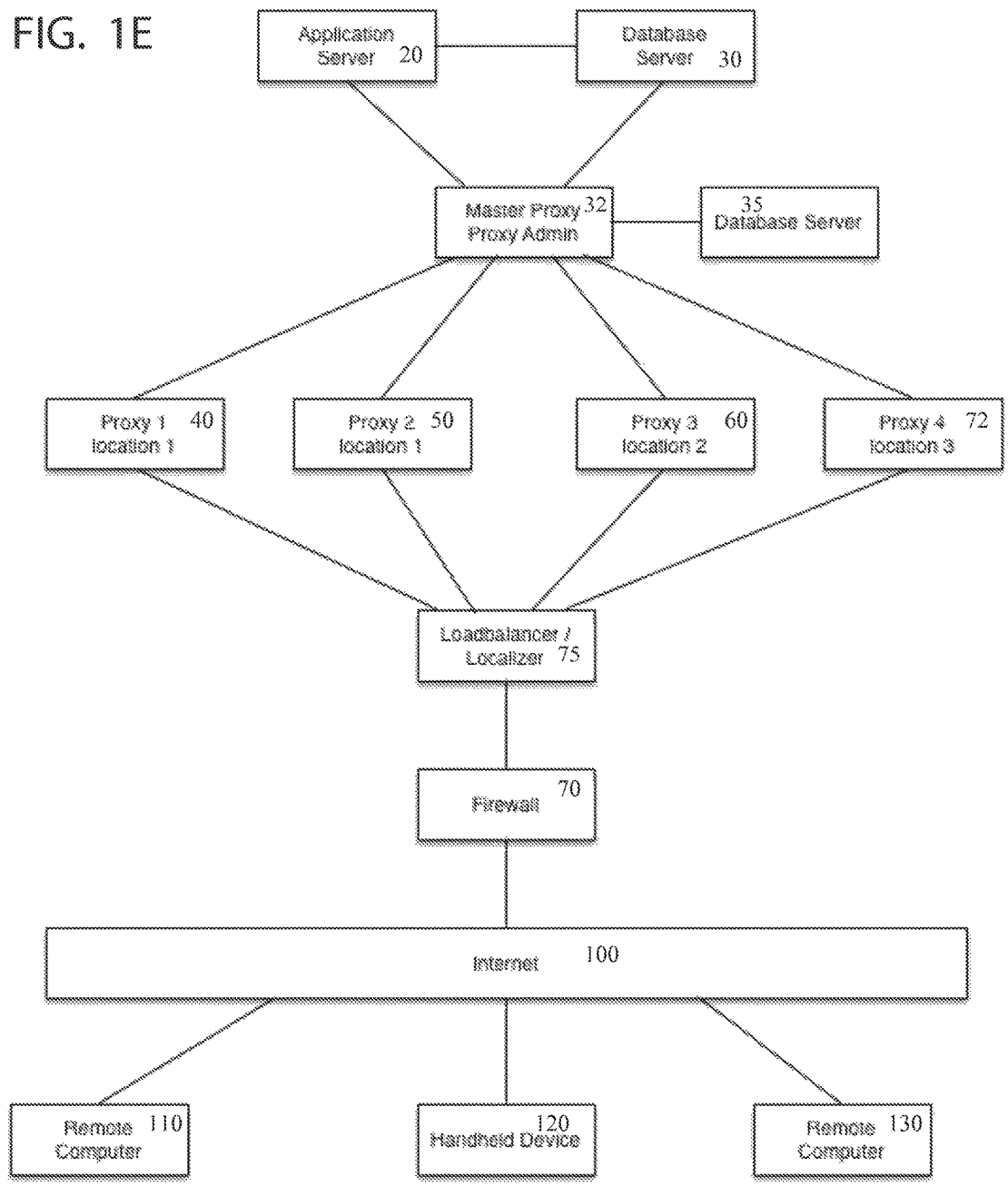
FIG. 1E is a fifth schematic block diagram of a computer network.

FIG. 1E shows another embodiment wherein with this embodiment, there are a plurality of different servers including a plurality of proxy servers, an application server 20, a database server 30, With this embodiment there is a master proxy-proxy admin server 32 which is coupled to both the application server 20 and the database server 30. There is also an additional database server 35 coupled to the master proxy server 32. Coupled to the master proxy server 32, are a plurality of proxy servers 40, 50, 60, and 72. The master proxy server 32 is configured to control the information that is pushed to the proxy servers 40, 50, 60, and 72.

In addition, there is a load balancer or localizer 75 which is configured to determine which proxy server among the proxy servers 40, 50, 60, and 72 to use. In addition, coupled to the load balancer 75 is a firewall 70. The firewall has outward facing ports to the internet 100 as well. Coupled to the internet 100 are a plurality of external devices such as remote computer 110, handheld device 120, and remote computer 130.

Figure 2:
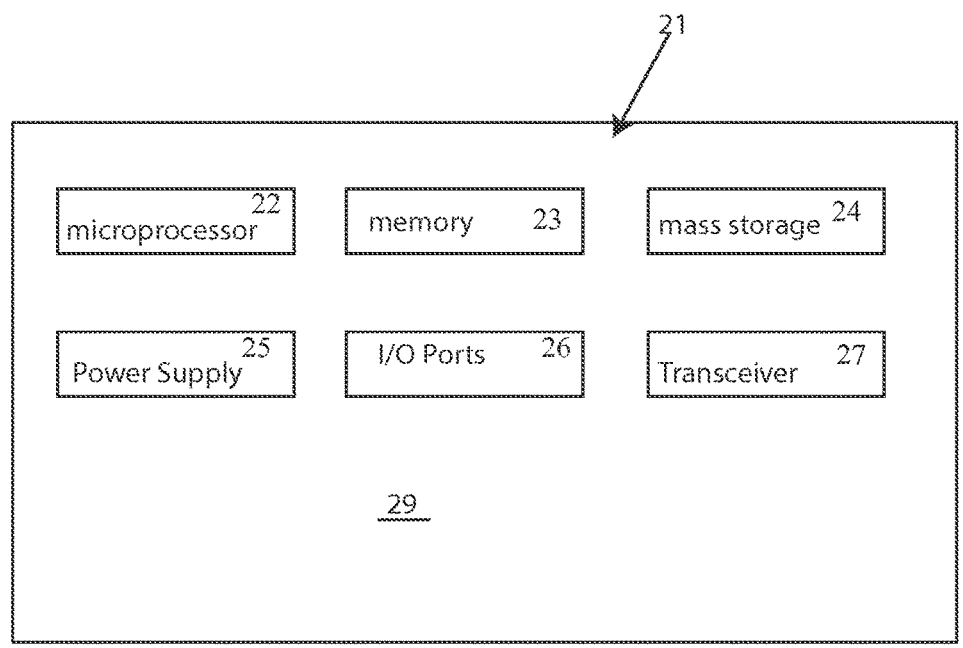
FIG. 2 is a schematic block diagram of a computer network.

FIG. 2 is a schematic block diagram of the components 21 which can be used in any one of the above identified servers. In this embodiment, there is a motherboard 29, which is used to hold a plurality of components such as a microprocessor 22, a memory 23, a mass storage 24, a power supply 25, I/O ports 26, and a transceiver 27 which forms at least one communication port for communicating with other servers. Each of these components are coupled to motherboard 29 so that they receive power from the power supply 25, and also can communicate with each other as well. To perform the steps of the following flowcharts, a series of steps stored in mass storage 24 are pulled by microprocessor 22, into memory 23. From memory 23, these instructions are uploaded into microprocessor 22 so that microprocessor 22 performs the steps claimed in these flow charts. In at least one example, the series of instructions stored in application server 20 on mass storage 24, or in memory 23, cause microprocessor 22 of application server 20 to pull data from database server 30, as well as data off of the data network, to perform functions which determine how to proceed with the steps claimed in FIGS. 4-8, 10A and 10B.

Figure 3:
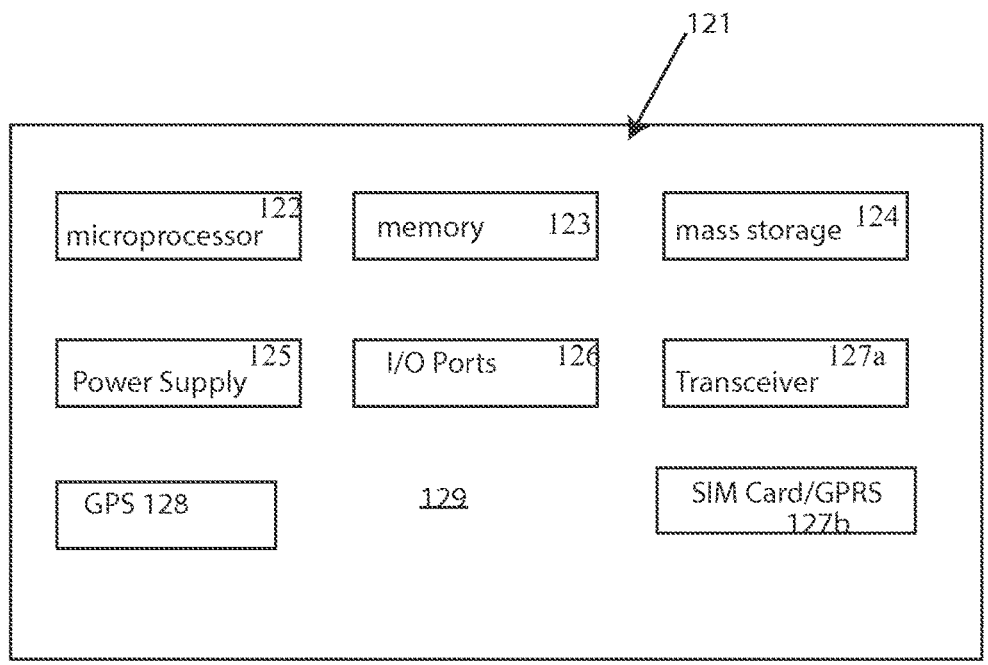
FIG. 3 is a schematic block diagram of a computer network.

FIG. 3 is also a schematic block diagram of the components which are used with the portable electronic devices 121, such as the remote computers 110 and 130 (FIGS. 1A-1E) as well as the handheld device 120. For example, there is a motherboard 129 wherein coupled to the motherboard is a microprocessor 122, a memory 123, a mass storage 124, a power supply 125, 1/0 ports 126, a transceiver 127a, a GPS module 128, and a SIM card or GPRS card 127b. All of these components are coupled together on motherboard 129, so that they receive power from power supply 125, and can communicate with each other. In particular, on these components can be stored cookies or web searching history. The identity of the component can also be embedded into these components as well as the GPS address of the component as well. In that way when a portable device such as a cellular telephone is connected to the network, its identity, location and searching history can be made known to the network.

For purposes of the following flow charts in FIGS. 4-8 and 10A and 10B, the term "system" comprises at least a microprocessor 22 which is configured to perform a series of steps. In at least one instance the microprocessor is housed in the application server 20. In at least one additional instance, it is a plurality of microprocessors such as microprocessor 22 which is housed both in the application server 20 and at least one proxy server or the database server. In addition, the system can also include the users' components such as a user's handheld device (such as microprocessor 122) such that the steps are distributed across the servers, and the user's handheld devices as well. The system can also include at least the memory 23, and or the mass storage 24, (on the servers) as well as the memory 123 and the mass storage 124 on the hand held devices as well.

Figure 4:
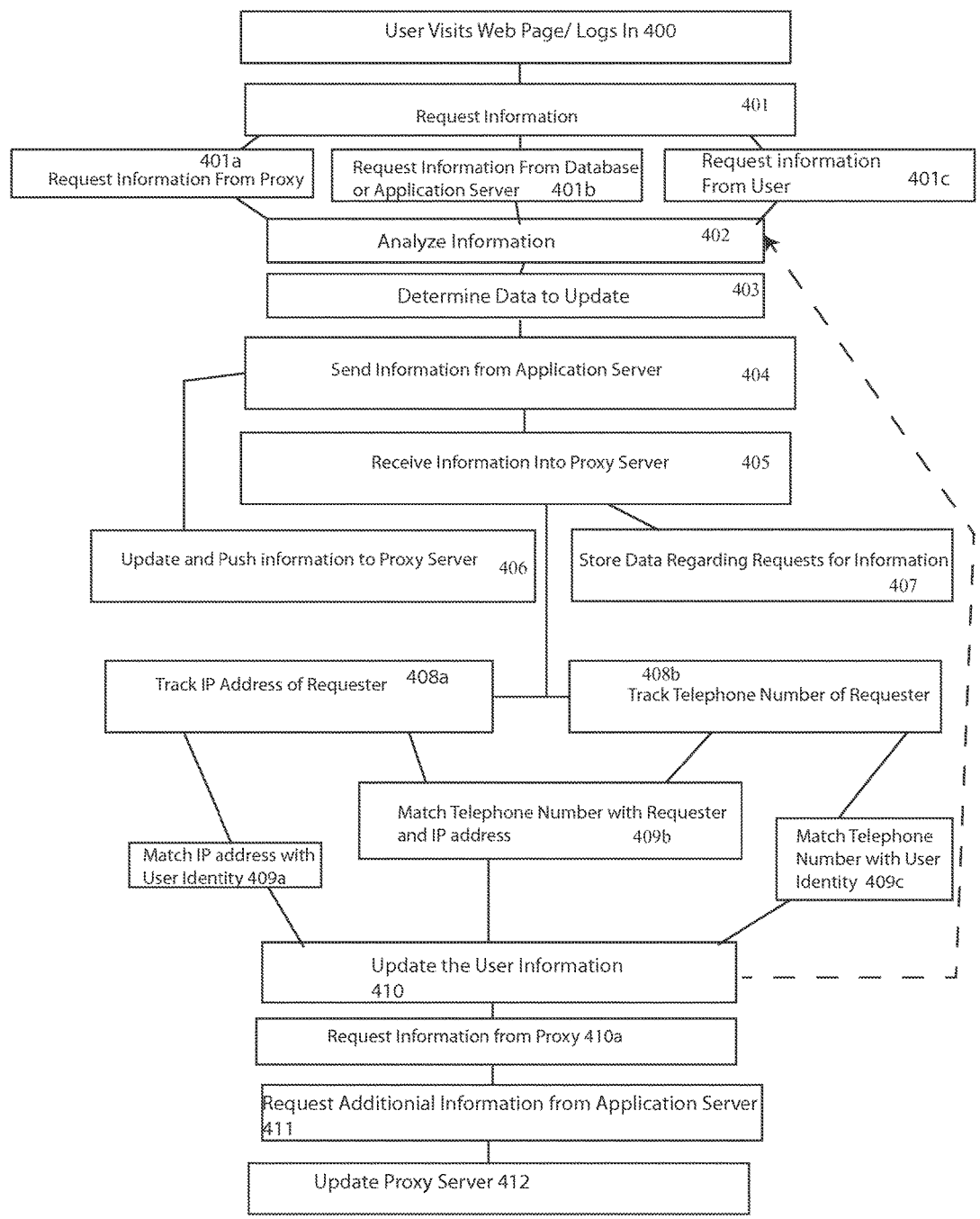
FIG. 4 is a flow chart for a process for updating a webpage using a computer network.

FIG. 4 is a flowchart which shows a first example of a process according to one embodiment of the invention. For example, the process starts in step 400 wherein the user either visits a web page or logs into a web page. In step 401 the system requests information. For example, in step 401a this request for information can be from the user. This information can be in the form of identity information, cookie or embedded information stored on the users' device. In addition, in step 401b, the system or at least microprocessor 22 in application server 20 can also request information from a proxy server such as proxy server 32 regarding the state of information in the proxy server. This information includes the content of the pages to be displayed. For example, application server 20 can poll or request the content of stored pages in the proxy server to pull in the content of these pages that would be displayed to an outside user. The entire content including the text, images, video, metadata and any other information can be requested to determine the actual state of the proxy server.

This information allows the application server 20 to determine the base state of the proxy server and its settings. Next, in step 401c, the system can request information regarding the user that is already in the system. This information can be stored in the application server's resident memory 23, in its mass storage 24, or in the storage of the database server 30 as well.

Next, all of this outside information, whether it is from the proxy, in step 401a, the application server in step 401b or from the user in step 401c, is analyzed by the proxy server in step 402.

In step 403 the system determines which data to update in the proxy server 32. For example, this is determined by determining the information that is in the proxy server at its present state, and then determining what information the user would like to receive. The remaining differences in this information is then the information that is to be updated to the proxy server.

Thus, in step 404 this information or change in information is updated to at least one proxy server such as any one of proxy servers 32, 40, 50, 60, 65, 67, and 72. With the example shown in FIG. 1E, the information is updated first to the master proxy administrator 32. This information is then pushed to the remaining proxy servers 40, 50, 60, and 72 in step 406.

Alternatively, in step 405 information is received into the proxy server wherein the processing of the proxy server such any one of proxy servers 32, 40, 50, 60, 65, 67, and 72 determines which data to update on a web page. Any one of these proxy servers in step 407 can then store data regarding these requests for information from Application server 20 or store the information or history of updating these proxy servers as well. This historical record of information can then be analyzed or reviewed for future reference regarding an efficient means for updating these proxy servers.

Next, in step 408a, if the identity of the user who is either viewing the web page or logged into a screen is not known, the system can track the IP address of the requester. This IP address could then be logged against a history of tracked IP addresses in database server 30 so that application server 20 can then determine the user's historical use of web pages which are controlled by the system.

Alternatively, or in addition, the system can track the telephone number of the requester of information in step 408b. This information can be tracked in one of a plurality of different ways. For example, if a user is logged into a web page controlled by the system and the user enters his/her telephone number into the system, this information is uploaded into the system, and then analyzed.

For example, in step 409a the system matches the IP address of the user with the records in the system thereby assigning an identity to the user. Alternatively, in step 409b the system can match the telephone number provided by the user with the IP address of the user and then assign an identity to the user as well. Alternatively, in step 409c the system can match the telephone number of the user with the user's identity. Once the user's information has been updated into the system in step 410, the system in step 410a can request information from the proxy server regarding the state of the proxy server. Next, the system in step 411 can request additional information from the application server 20 to update the proxy server such as any one of proxy servers 32, 40, 50, 60, 65, 67, and 72 in step 412.

Figure 5:
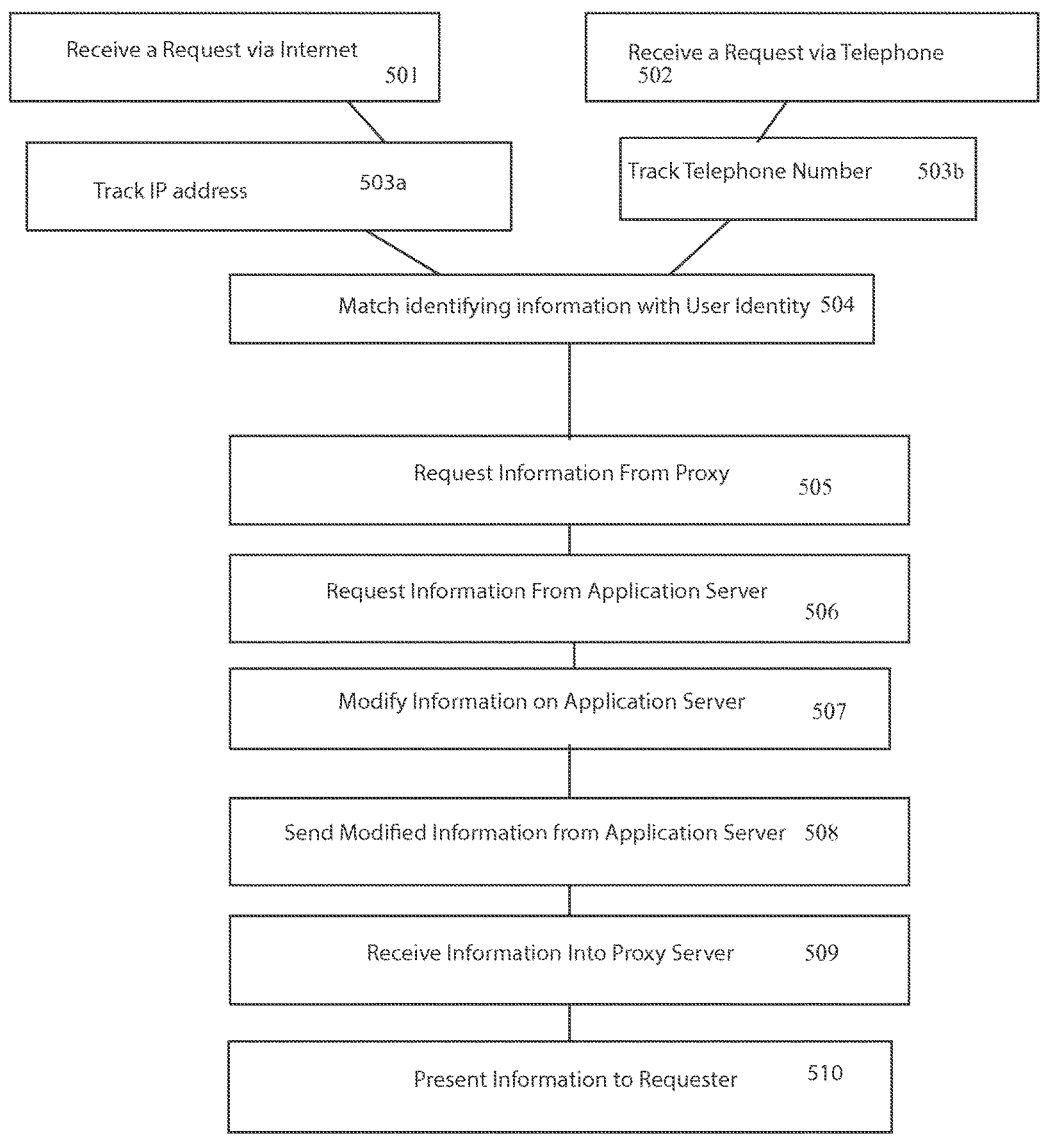
FIG. 5 is a second flow chart for updating a web page using a computer network.

FIG. 5 is a flow chart detailing a plurality of steps which starts with step 501 wherein the system receives a request for information from the internet. This occurs when the user either visits a web page system. This information can include any one of the following: the user's IP address, the user's cookies, the user's location, the user's web log history, or any other identity information about the user as shown in step 503a. Alternatively, in step 502 the system receives a request via the telephone. If the user calls on the telephone, then the system can track the telephone number in step 503b.

In step 504 the system can match the user's identifying information with the user's identity. This occurs by identifying the user either through the user's IP address or via the user's telephone number. Once this occurs, any web history or other data about the user which is stored in a database such as database server 30 is matched with the user. Once the user's identity is matched, the system then in step 505 requests information from the proxy server. This request for information can be in the form of a request for the current state of information stored in the proxy server.

Next, in step 506 the system can request information that is stored already in the application server about the information about the user. This information could include any analysis regarding the user, his identity and any other analytics used to determine the identity of the user as well as any information that can be calculated based upon the user's information.

Next, in step 507 once this information is determined, the system can then modify information stored in the application server 20 which is used to present to different users. Next, in step 508 this information is sent from the application server out into the proxy server 509. Next, in step 510, the system can present this updated information to the requester.

Figure 6:
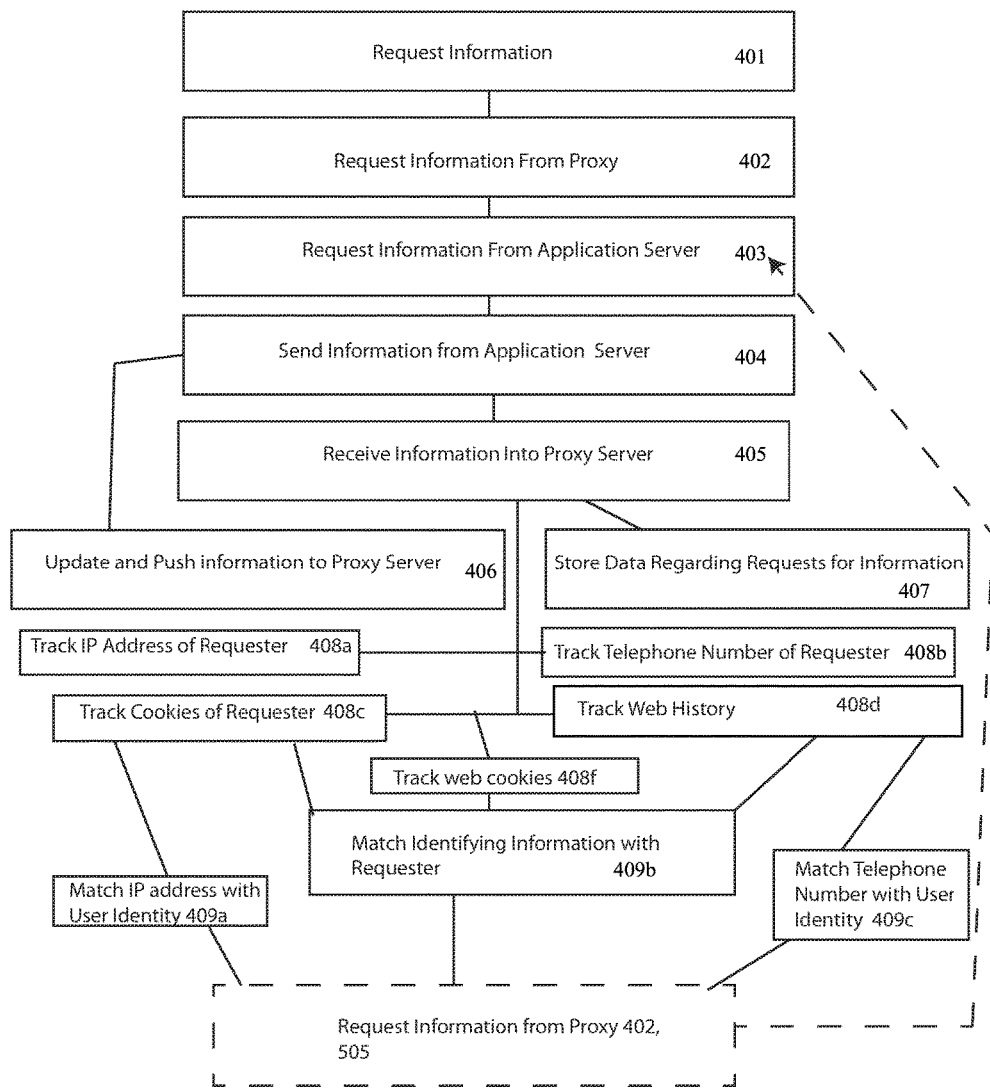
FIG. 6 is another flow chart for updating a web page using a computer network.

FIG. 6 is an alternative process for updating a web page based upon user information. For example, the process starts in step 401 wherein the user requests information from a web page. This could include a user logging into a particular web page or viewing data on a web page. At this point, with the user logging into the web page, some minimal form of identity of the user could be transmitted to the system, such as login information, or recent clicks or selections by the user on the web page.

Next, in step 402 the system could request information from the proxy server. This request for information could be regarding the state of the content of the proxy server. Next, the process involves step 403 wherein the system can request information that is stored in the application server. Next, in step 404 the system sends information from the application server to the proxy server. Next, in step 405, the system is configured to receive information into the proxy server such as proxy server 32.

The information that is updated to the proxy server can be in the form of updated advertisements, updated data on web pages or other suitable updated data. The information that is received into the proxy server can be in the form of data to update web pages such as data that is pushed to the proxy server in step 406. Alternatively, the data regarding the requests for information can be stored in the proxy server as well in step 407.

Next, in steps 408a and 408b the system can track the IP address of the user, as well as the telephone number of the user respectively. In addition, the system can also track the cookies of the requester in step 408c or track the web history of the user in step 408d. Step 408f involves the system tracking the web cookies 408f as well.

With this additional information, the system can match this information with the user to determine the type of customized information to display to the user. For example, in step 409*a* the system can match the IP address of the user with the user's identity. This information can then be stored in the database such as in database server 30. In addition, in step 409*b*, the system can alternatively match the identifying information relating to the user's cookies, the web cookies, and the web history. Alternatively, in step 409*c* the system can match the telephone number of the user with the identity of the user as well. This would occur if the user had placed a telephone call with a provider which was associated with the system. In step 402/505, the system can cycle back or loop back to further analyze and process information relating to the proxy server.

Figure 7:
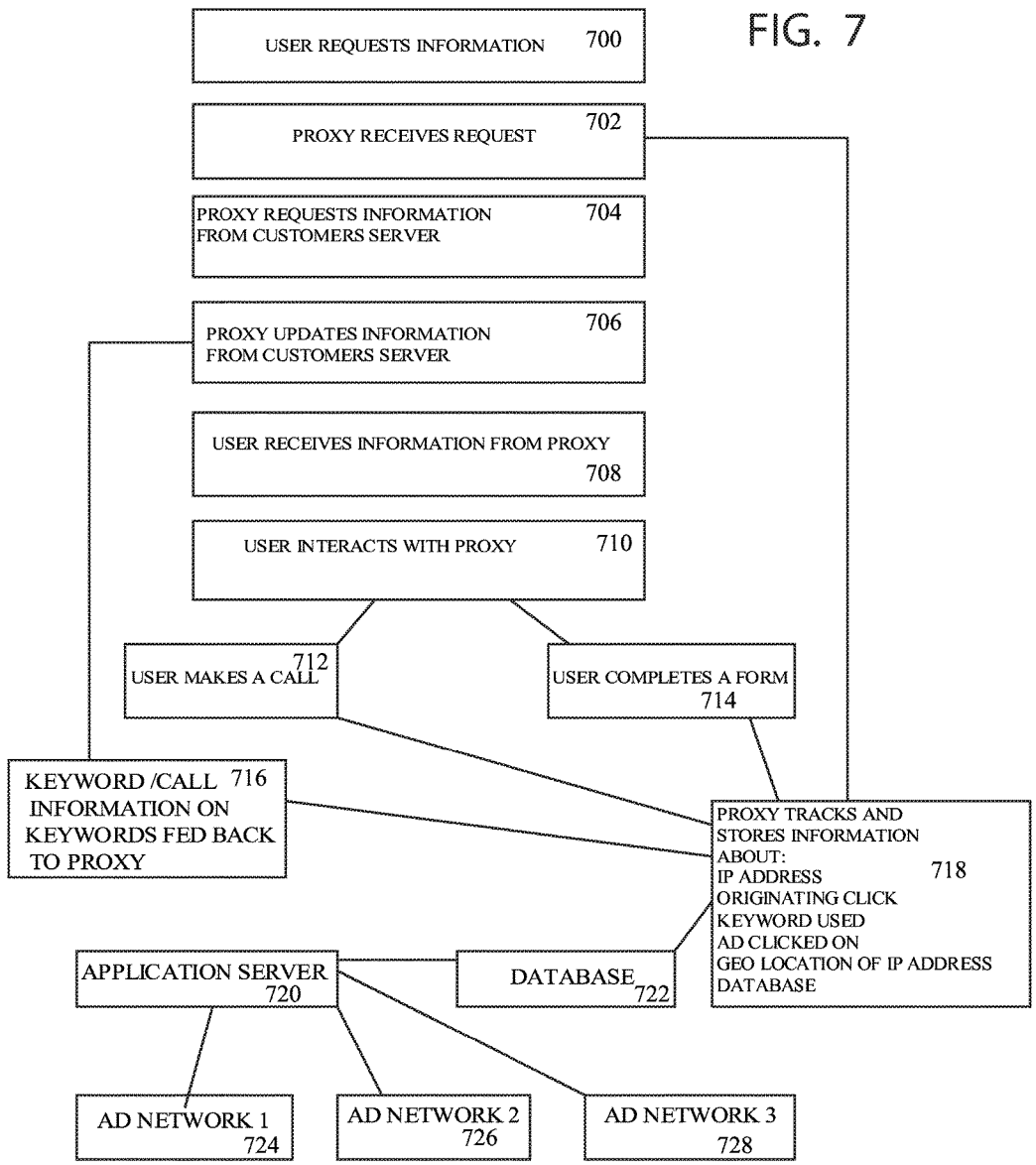
FIG. 7 is another flow chart for updating a web page using a computer network.

FIG. 7 is another example of a process for updating advertisements based upon user defined information. For example, the process starts in step 700 where in the user requests information from the system. This request for information can comprise visiting a web page, logging into a site or any other request for information. Next, in step 702, the proxy server receives a request for the information that has been placed by the user. For example, if the user logs in to a site or web page, the proxy server would then receive a request for information about this site. At this point, the proxy server such as proxy server 32, requests information from the customer's server in step 704. This request could be in the form of a request for the login information of the user, the IP address of the user, a location of the user, the identity of the user or any other suitable identification information. Next, in step 706 the proxy can update the information from the customer's server. This information is the information that is associated with either an individual user's identification or multiple user's identification based upon the basic information claimed above such as with the user's location, telephone number, IP address, cookies, login information or any other type of information.

Next, in step 708 the user receives information from the proxy. This information can be in the form of a web page such as either a static web page or an interactive web page which would gather information from the user as the user interacts with the proxy server in step 710. For example, as the user is logged into the web page that is provided by the proxy server in step 710, the user can make a telephone call in step 712 to a client of the proxy server who is advertising goods on the web page. This call information can be logged by the system, with the caller's telephone number and IP address being matched with the user's identity in database server 30. Alternatively, or in addition, the user can complete a form in step 714. In step 716 there is a keyword or call information that is based upon keywords provided by the user which are fed back into the proxy server in step 716 In step 718 the proxy server tracks and stores information about the user's IP address, the originating click, the keywords used, the ads clicked on, the geo location of the IP address in step 718. This information is then updated to both the application server in step 720 and to the database server in step 722. Based upon the information uploaded to the proxy server and forwarded onto both the database server, the application server then serves customized advertisements through different advertisement networks in steps 724, 726, and 728.

Figure 8:
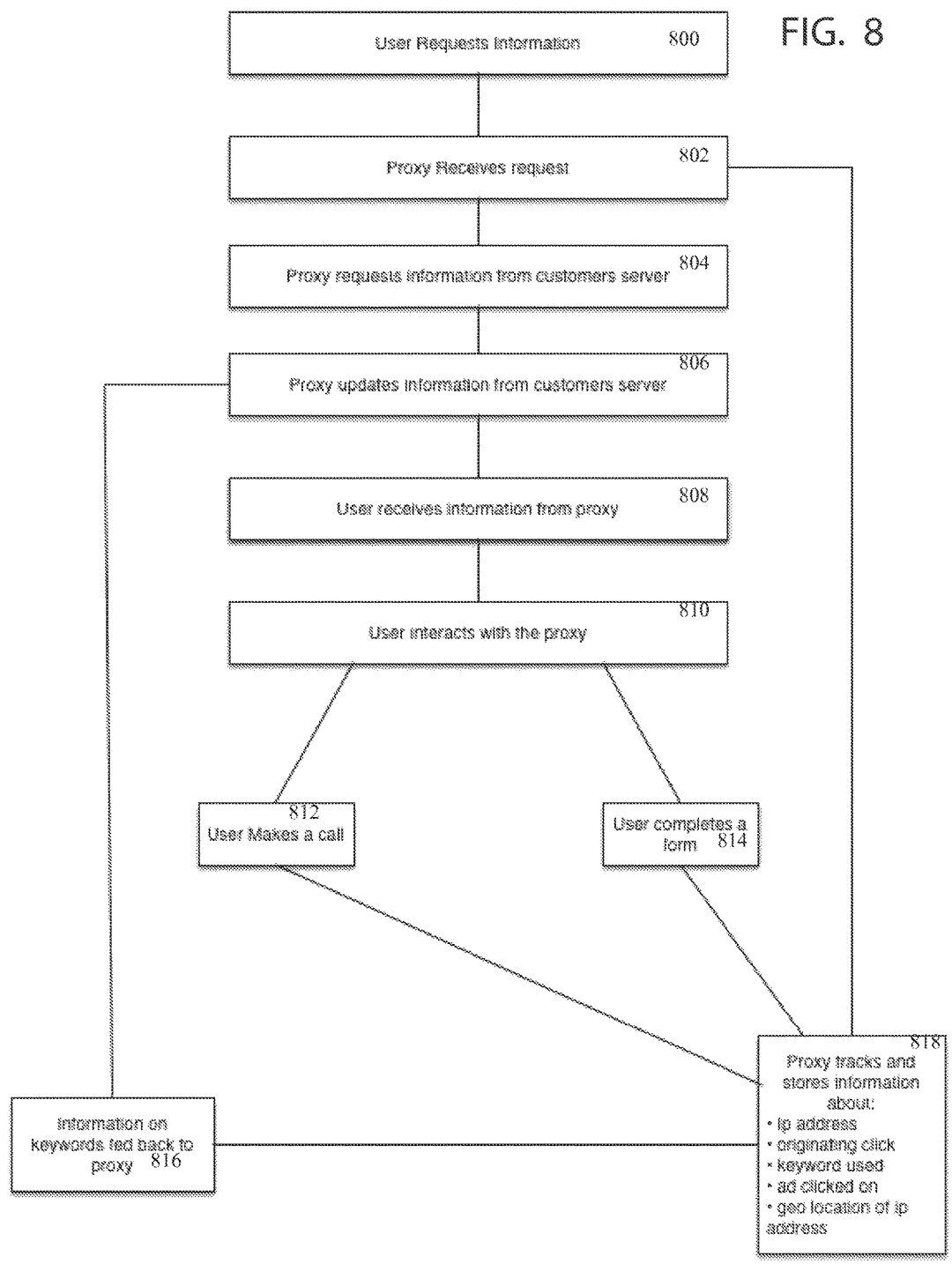
FIG. 8 is another flow chart for updating a web page using a computer network.

FIG. 8 discloses another example of a similar process to that shown in FIG. 7. For example, steps 800-814 are substantially similar to the steps 700-714 shown in FIG. 7. However, unlike the flow chart shown in FIG. 7, the proxy server in FIG. 8 generates the changes to the text of the web page or the changes to the advertisement as well in step 808.

Figure 9:
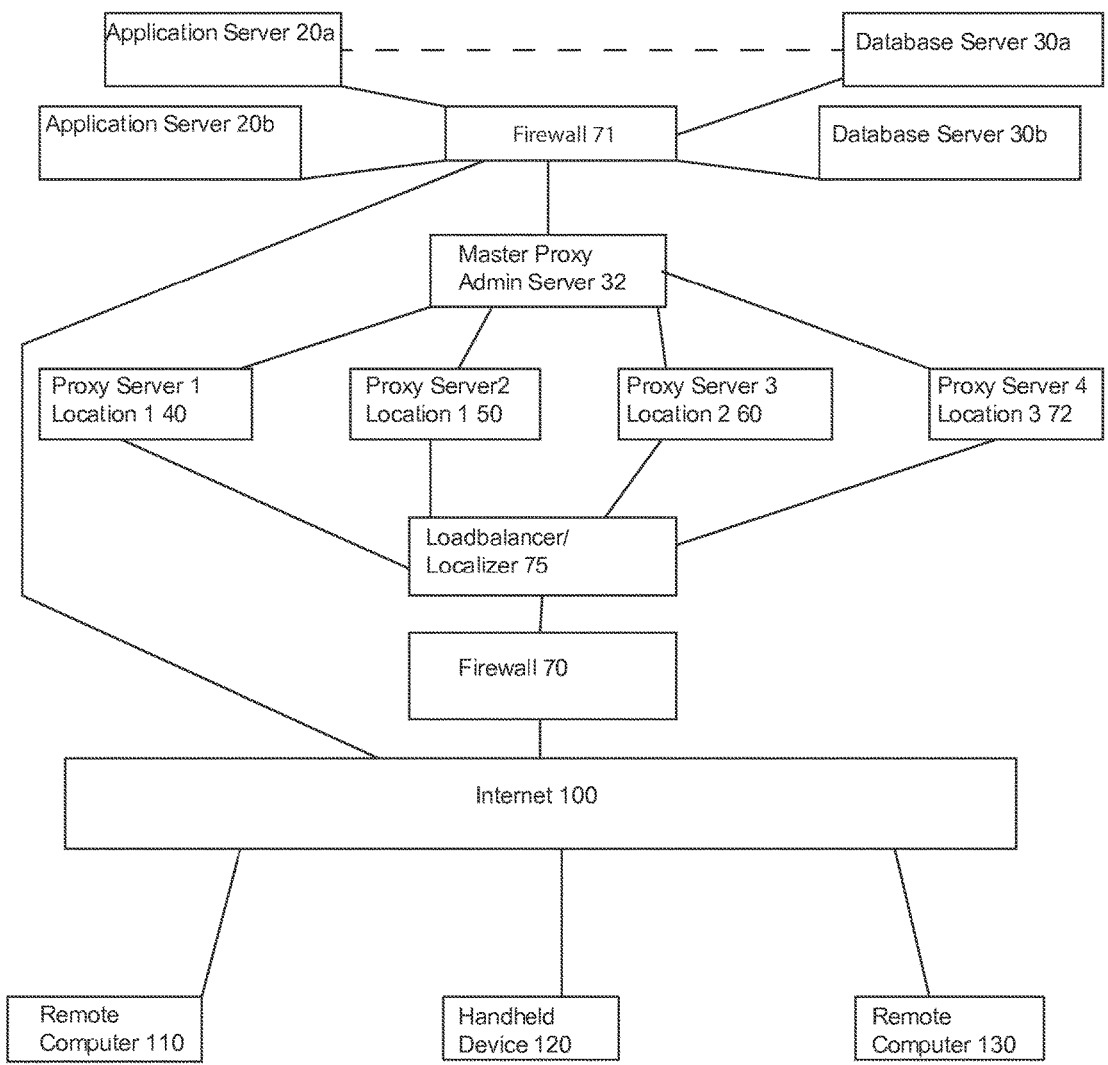
FIG. 9 is an embodiment of an advertising platform.

FIG. 9 discloses another example, of a customizable advertisement system. For example, there are multiple application servers 20*a* and 20*b*. There are also multiple database servers 30*a* and 30*b* as well. Both the application servers and the database servers are load balanced across the cloud. All of these servers 20*a*, 20*b*, 30*a* and 30*b* are coupled to a firewall 71 and then either directly coupled to at least one master proxy administrative server 32 or to the internet 100. The master proxy administrative server 32 is coupled to a plurality of load balanced proxy servers as well. For example, each of the proxy servers 40, 50, 60 and 72 can be load balanced. These proxy servers can be distributed across a single country or across the globe such that these proxy servers can be located in different locations. For example, one set of proxy servers can be located in the New York metropolitan area such as in location 1. Another set of proxy servers can be located in a different location such as Austin, Tex. which would be location 2. Another set of proxy servers could be located in a third location such as Vancouver Canada which would be location 3. Therefore, users logging into a web page in New Jersey, would likely be directed to the closest set of proxy servers such as in location 1 because this would be the closest connection. However, if the servers located in location 1 are too taxed with work, then the user could be directed to the next adjacent available location for servers such as location 2 which would be Austin, Tex. The load balancer/localizer 75 also determines based upon either the telephone connection or IP connection the general address to route the user to the most geographically convenient location for the proxy servers.

The two firewalls 70 and 71 are coupled to the internet 100 and have outward facing ports to the internet 100 to receive information from outside devices such as remote computer 110, handheld device 120, and remote computer 130.

Figure 10A:
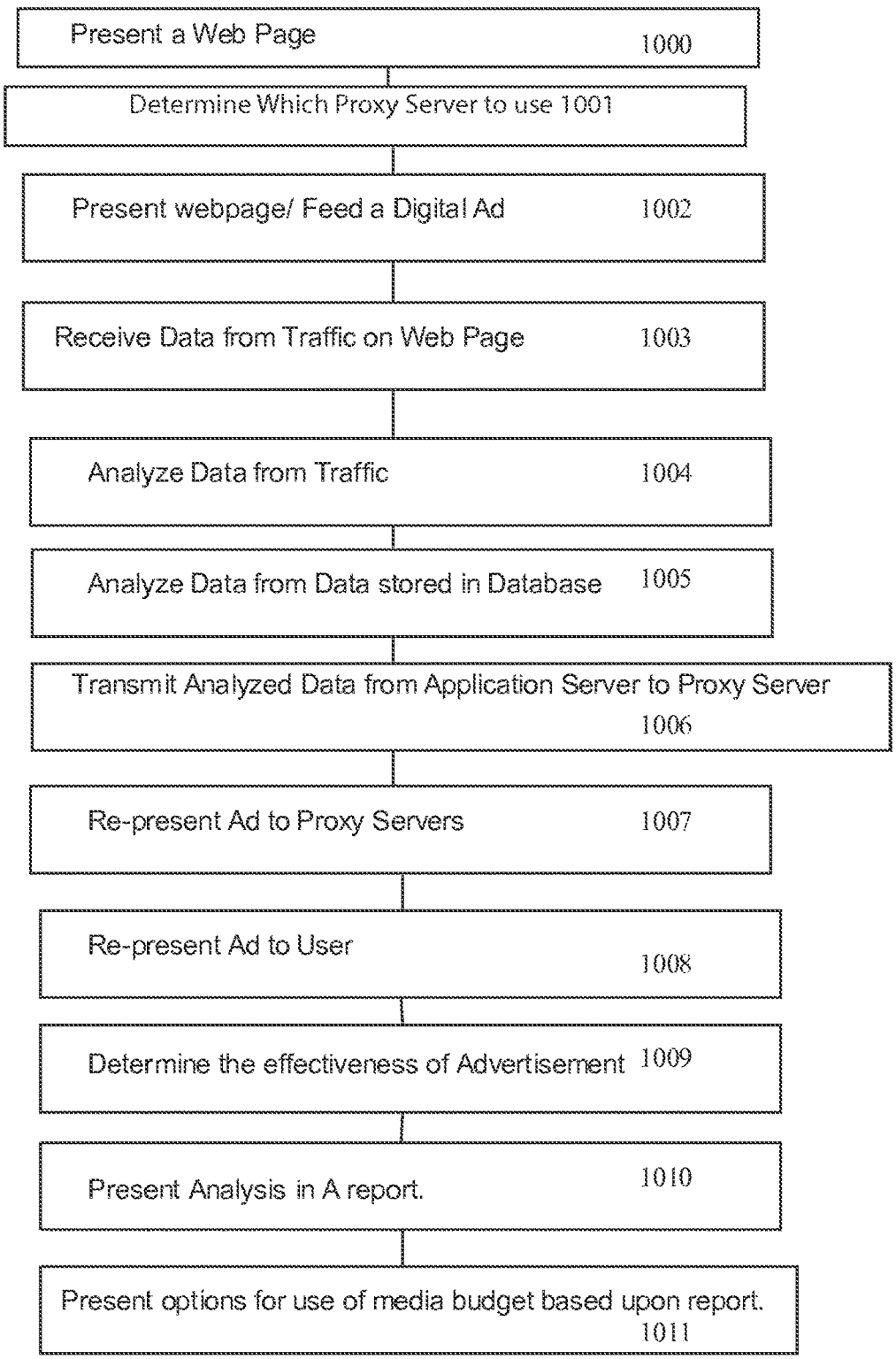
FIG. 10A is a first flow chart for presenting customized advertisements.

FIG. 10A is another example of the customized advertising process. This process can be associated with the system shown in FIG. 9. For example, the system starts with step 1000 wherein a web page is presented to a user. This web page can be presented by any one of the proxy servers 40, 50, 60, and 72. As disclosed above, the Load balancer/localizer 75 would determine the most appropriate proxy server to use. Each client of the system would have a registered IP address associated with a domain name. The client would have their domain name and IP address forwarded to an address associated with the load balancer/localizer server 75. Therefore, all incoming traffic would be routed first through the load balancer/localizer 75 and then distributed to one or more of the proxy servers in step 1001.

Next, in step 1002 the system would present a web page or feed a digital ad to the user. When the user interacts with the web page the system would receive data from traffic from the user on the web page in step 1003. This information could be in the form of the user's IP address, click history or any other initial information about the user or the user's activity. Next, in step 1004 the system could analyze the data from the traffic on the web page. This information could be analyzed either in any one of the proxy servers or in any one of the application servers 20*a* or 20*b* using at least one microprocessor such as microprocessor 21. Next, in step 1005 the system would analyze the data stored in the database. Once the data from the database is analyzed and the data received from the users logged into the system is analyzed, this analyzed data would then be sent to the proxy server as a set of instructions in step 1006. Next, in step 1007 the proxy server would re-present advertisements which would be updated based upon this new set of instructions sent from any one of the application servers 20*a* and 20*b* to the proxy servers.

Next, in step 1008 the new advertisement or new information on the web page would be presented to the user for further viewing. Based upon the click thru rate, or the purchasing history of each user, the system could determine the effectiveness of this modified advertisement in step 1009.

Next, in step 1010 the system could then present this information in a report to the subscribing client. To better assist the client in their selection of advertisements, the system could then present options for use of a media budget based upon the report presented to the client in step 1011.

Figure 10B:
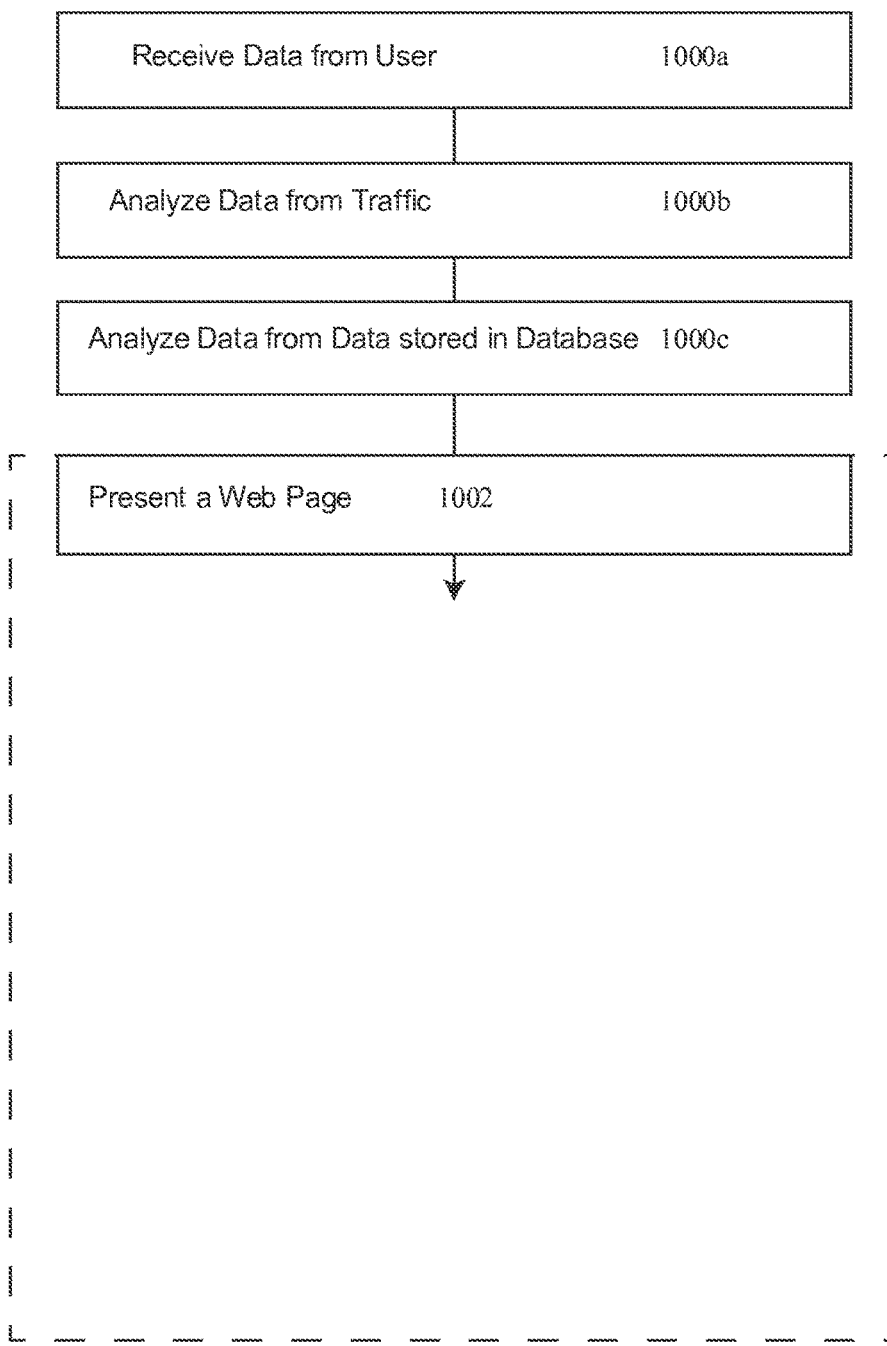
FIG. 10B is a second flow chart for presenting customized advertisements.

FIG. 10B shows an alternative process wherein the system can receive data from a user in step 1000A. This data can be in the form of login information, IP address, web cookies, telephone number, or any other information presented by the user. Next, in step 1000B the system would receive and analyze data from the general web traffic as well. This general web traffic can be in the form of traffic across many different inputs from many different users. Next, in step 1000C the system can analyze data stored in the database. This data would relate to past data stored by the previous users of the system. Next, the system would use all of this information to then present a web page to different users of the system. The difference between this process and the process disclosed in FIG. 10A is that this process includes data presented by multiple users to then formulate a set of data to be presented on a web page.

Figure 11A:
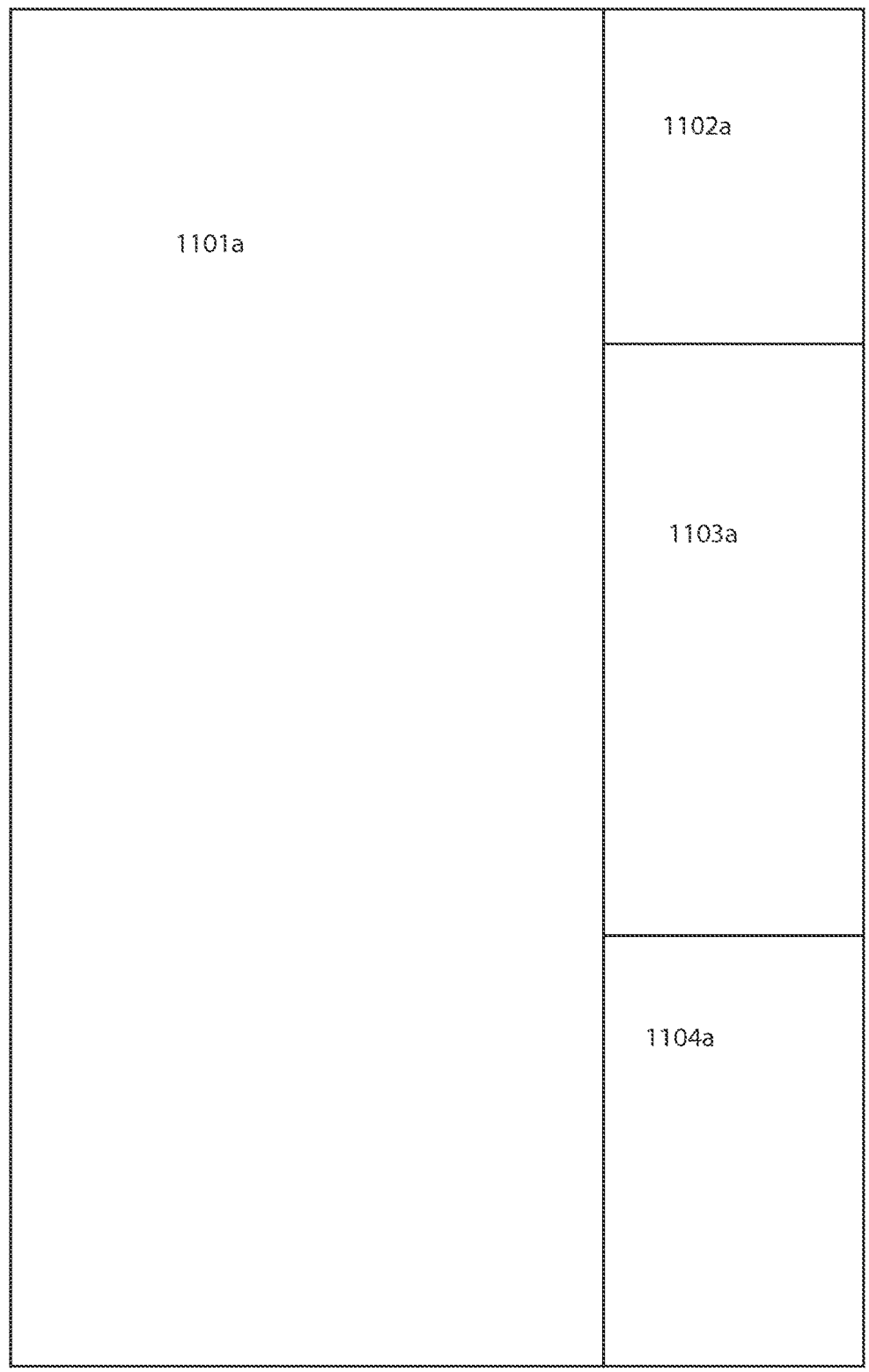
FIG. 11A shows a first state of a first set of web pages.
Figure 11B:
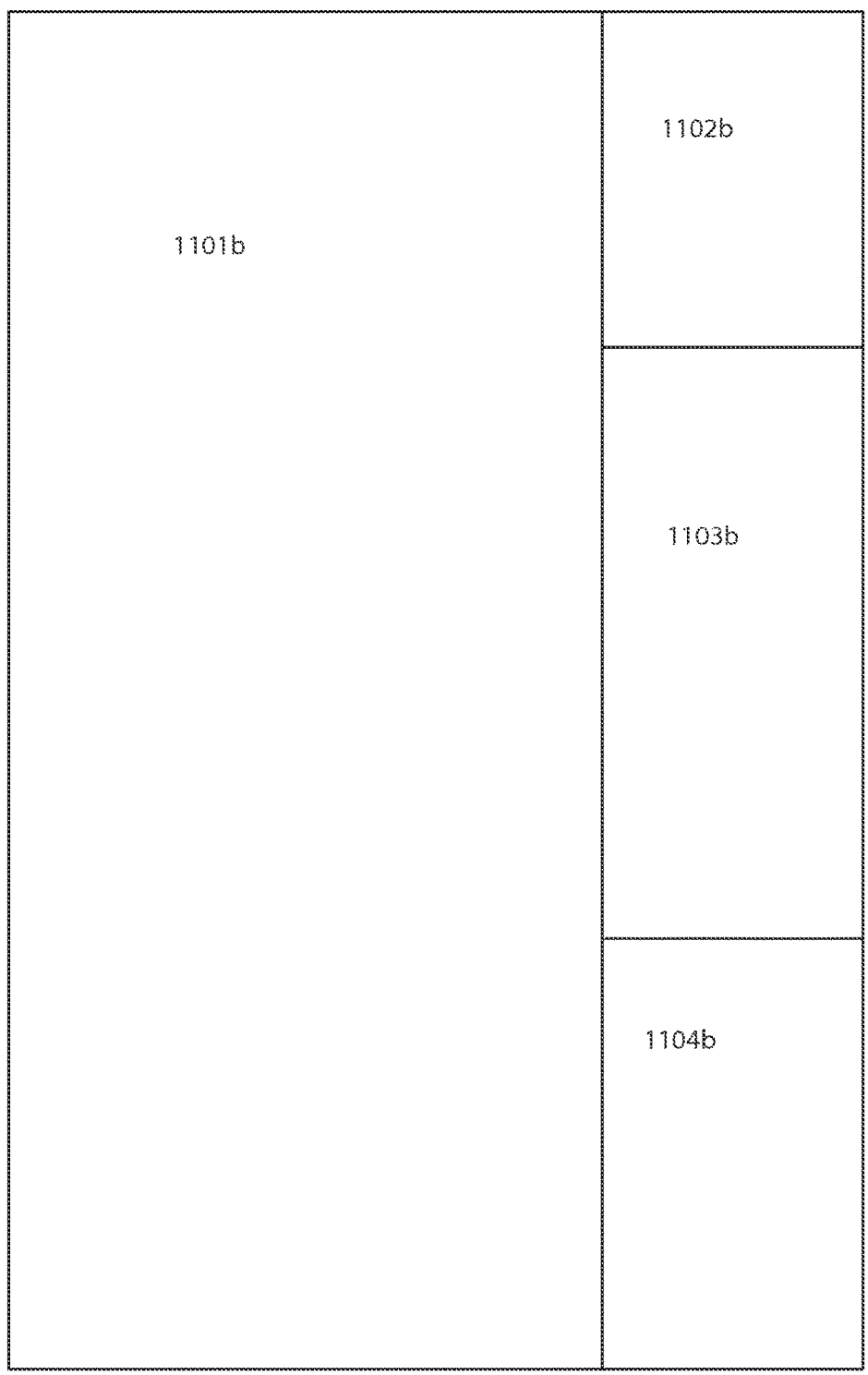
FIG. 11B shows a second state of changes to a web page that can occur using this proxy server

FIGS. 11A and 11B show the changes to a web page that can occur using this proxy server system. For example, FIG. 11A shows the initial presentation of a web page. In this initial presentation. For example, on this web page there are a plurality of different sections. For example, there is a first section 1101*a*, which can include informative text. A second section 1102*a* can include a first contact section. Another section 1103*a* can include a first advertisement. Section 1104*a* can include a second advertisement. Based upon the calculations performed by the application server 20 there can be changes to the text of the first section 1101*a* so that different text can be presented in new section 1101*b*. In addition, section 1102*a* can change to section 1102*b* via a change in the contact information for the company. For example, if the company presenting the web site has two offices, an east coast office and a west coast office (in the United States) the web page can display a set of east coast contact information in section 1102*a* if a user logs in from the east coast. Alternatively, west coast contact information can be displayed in section 1102*b* if the user is logging in from the west coast. Similarly advertising sections 1103*a* and 1104*a* can be tailored or customized to sections 1103*b* and 1104*b* based upon the information taken in from the application server 20 and the proxy servers as well.

Essentially, because this system can simultaneously receive telephone calls over a public switched telephone network, while also receiving data from user's remote devices, and automatically update a webpage based upon the user's data, without any additional user interaction, the system creates a scalable, efficient, repeatable system which can handle multiple simultaneous users such as 1000 simultaneous users, 10,000 simultaneous users, or even 100,000 or more simultaneous users and still efficiently handle updating thousands, tens of thousands, or even millions of web pages automatically. This can be achieved through a distributed set of load balanced proxy servers such as proxy servers 40, 50, 60, and 72 via a load balancer 75 so that the user logging into a web page would not notice any real delay in the delivery of an updated web page which is created dynamically in real time.

In all the systems and processes shown above can each create a customized web presentation system which is configured to tailor specific language and advertising for users based upon information input into the system.

Accordingly, while at least one embodiment of the present invention has been shown and described, it is obvious that many changes and modifications may be made thereunto without departing from the spirit and scope of the invention.

What is claimed is:

1. A system for automatically modifying data over a computer network comprising:
   a first application server having a microprocessor;
   a database server having a microprocessor;
   a plurality of proxy servers each having a microprocessor;
   at least one computer network coupling said first application server, said database server, and said plurality of proxy servers together;
   at least one remote computer having a microprocessor coupled to said at least one computer network,
   at least one load balancer having a microprocessor, said at least one load balancer coupled to said at least one computer network wherein said at least one load balancer is configured to determine which of said proxy servers to use;
   wherein said at least one remote computer is configured to communicate through said at least one computer network to said at least one load balancer, and on to at least one of said plurality of proxy servers and wherein said application server is configured to update data to be presented on said proxy server such that a user in communication with said proxy server receives an updated web page;
   wherein said plurality of proxy servers comprises at least one master proxy server and a plurality of slave proxy servers which are configured to be controlled by said master proxy server.

2. The system as in claim 1, wherein said load balancer is configured to determine which proxy server to select based upon the amount of processing power used by each proxy server.

3. The system as in claim 1, wherein said load balancer is configured to determine which proxy server to select based upon the amount of bandwidth and network traffic that each proxy server is using.

4. The system as in claim 1, wherein said master proxy administrator server is configured to switch between each of said plurality of proxy servers based upon instructions from said load balancer.

5. The system as in claim 4, wherein said application server, said database server, each of said plurality of proxy servers, and said load balancer each comprise at least a microprocessor.

6. The system as in claim 5, wherein said application server, said database server, each of said plurality of proxy servers, and said load balancer each further comprise at least one memory.

7. The system as in claim 6, wherein said application server is configured to perform the following steps:
   a) requesting information from at least one user;
   b) requesting information from said at least one proxy server;
   c) requesting information from said at least one database server;
   d) analyzing using at least one microprocessor in said at least one application server the contents of said at least one user, said at least one proxy server, and said at least one database server to determine which content to further update to said proxy server; and e) transforming information presented on said proxy server based upon said step of analyzing using said at least one application server the contents of said at least one user, said at least one proxy server and said at least one database server.

8. The system as in claim 7, wherein said application server is configured to gather the following information from said user: IP address of the user; telephone number of the user; web history of the user; web cookies of the user, login information from said user.

9. The system as in claim 8, wherein the system is configured to perform the following additional step: matching the telephone number of the user with the user's identity.

* * * * *